United States Patent [19]

Possati

[11] 3,808,696
[45] May 7, 1974

[54] MEASURING APPARATUS INCLUDING POSITION CORRECTING MEANS

[75] Inventor: Mario Possati, Bologna, Italy

[73] Assignee: Finke Italiana Marposs Soc., In Accomadita Semplice di Mario Possati & Co., Bentivoglio-S. Marino, Italy

[22] Filed: Dec. 27, 1971

[21] Appl. No.: 212,105

[30] Foreign Application Priority Data
Dec. 29, 1970 Italy .................................. 3651/70

[52] U.S. Cl. .......... 33/178 E, 33/174 L, 33/174 PA
[51] Int. Cl. ........................ G01b 5/12, G01b 5/02
[58] Field of Search ........ 33/174 R, 174 P, 174 PA, 33/174 PB, 174 L, 174 Q, 174 PC, 178 R, 178 E, 178 F, 147 K, 143 L, 147 N, 148 H

[56] References Cited
UNITED STATES PATENTS

| 3,150,070 | 3/1939 | Kregecz | 33/178 E |
|---|---|---|---|
| 3,007,252 | 11/1961 | Munn | 33/178 E |
| 3,646,685 | 3/1972 | Goodenough | 33/178 F |
| 3,119,187 | 1/1964 | Meyer | 33/147 K |
| 3,303,572 | 2/1967 | Vreeland, Jr. | 33/178 E |
| 2,607,128 | 8/1952 | Newhall | 33/178 E |
| 2,883,758 | 4/1959 | Zelnick | 33/178 R |
| 3,233,329 | 2/1966 | Richter | 33/178 R |
| 2,908,085 | 10/1959 | Price et al. | 33/178 F |

Primary Examiner—Billy S. Taylor
Assistant Examiner—Jon W. Henry
Attorney, Agent, or Firm—Stevens, Davis, Miller & Mosher

[57] ABSTRACT

Measuring apparatus which corrects for errors in positioning relative to the part to be measured comprising first and second pairs of feelers equipped with transducers and electrical means coupled to the transducers. The electrical means provides an output which has a main component corresponding to the sum of the transducer output signals of one pair and a corrective component corresponding to the square of the difference between the transducer output signals of the other pair.

7 Claims, 6 Drawing Figures

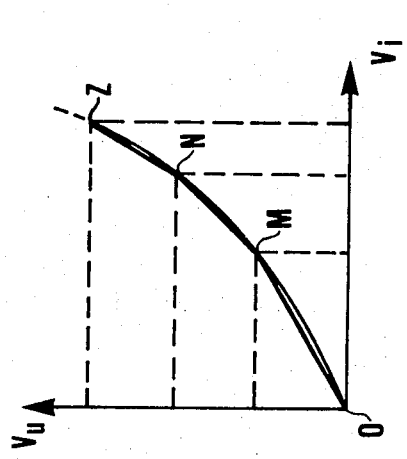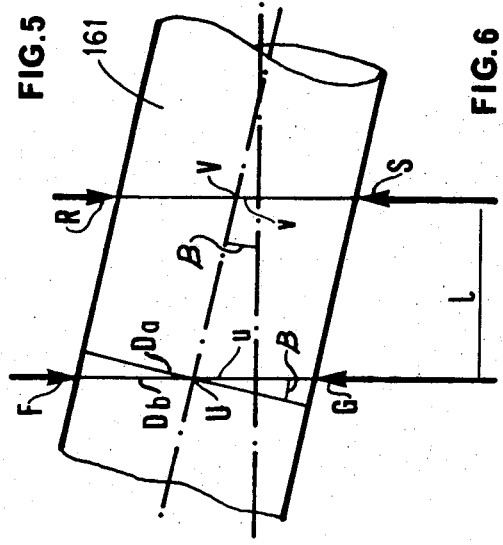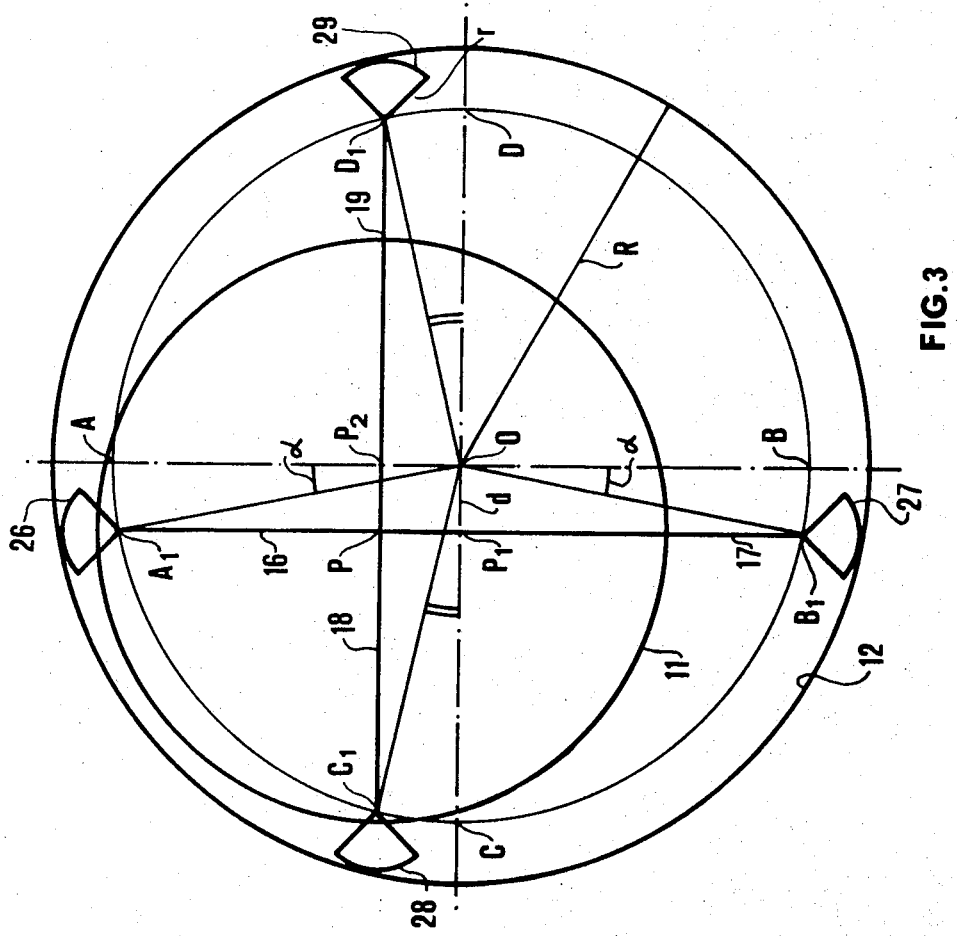

MEASURING APPARATUS INCLUDING POSITION CORRECTING MEANS

BACKGROUND OF THE INVENTION

The present invention relates to a device for correcting errors resulting from the erroneous positioning of a part to be measured with respect to a measuring member.

These errors result in particular from the necessity of having sufficiently great tolerances in the relative positioning of the part to be measured and the measuring member so as to assure the placement of the latter on the part without striking or breaking the part. In this way the measurement will be made in a specific region around the theoretical point resulting in errors which may be of the same order of magnitude as the total tolerance of the dimension being measured and which are therefore not acceptable. This error may be decreased only by decreasing the positioning tolerances of the piece and the measurement member, but this is possible only within certain limits which in any event make the system less reliable and, where there are several dimensions to be measured, becomes absolutely impossible.

In some cases, this problem is solved by leaving the workpiece to be measured and the measuring member free in relative positioning and taking the minimum tolerances between the two. In this way, there is avoided striking and breaking of the part, but various problems remain unsolved. For example, this method may not be used when several measuring members are necessary to measure different dimensions on the same workpiece and when these dimensions must be combined with each other in order to obtain, for instance, information as to distance, parallelism or perpendicularity of the said dimensions. If the measuring members are left free to adjust themselves, this information is obviously unreliable.

SUMMARY OF THE INVENTION

The problem which the present invention proposes to solve is the problem of obtaining a device for the correction of errors resulting from an erroneous positioning of the piece to be measured with respect to the measurement member predominately as a result of the tolerances necessary to guarantee the placement of one on the other.

This problem is solved by a device in accordance with the invention comprising a measuring member with a first pair of feelers for the determination of a first dimension of the piece to be measured and a second pair of feelers for the determination of a second dimension of the piece, and characterized by the fact that the first and second pairs of feelers are arranged on a single support, electrical means being provided to supply the measurement of each of the dimensions by a main term composed of a combination of the measurements determined by the corresponding pair of feelers and a secondary correction term composed of a combination of the measurements determined by the other pair of feelers.

DESCRIPTION OF THE DRAWINGS

FIG. 3 is a diagram illustrating the measuring member in operating position;

FIG. 5 is a diagram showing the principles of operation of a detail of the device of FIG. 4; and FIG. 6 is a diagram illustrating a second embodiment of a measuring member in accordance with the invention.

DESCRIPTION OF THE PREFERRED EMBODIMENT

Figure 2:
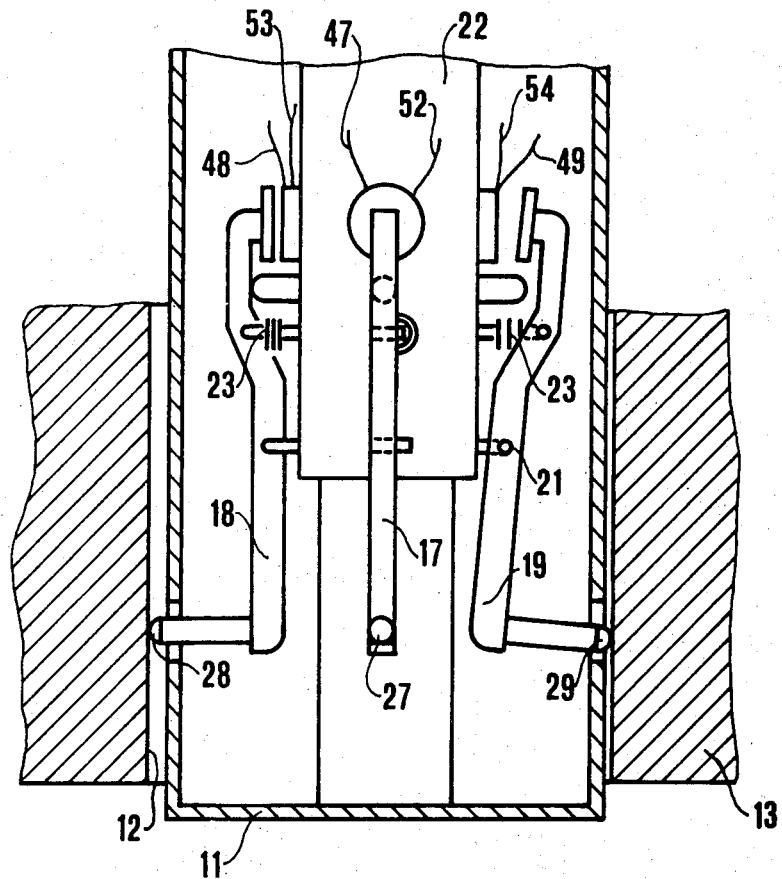
FIG. 2 is a front view, partially in section of the device of FIG. 1.
Figure 1:
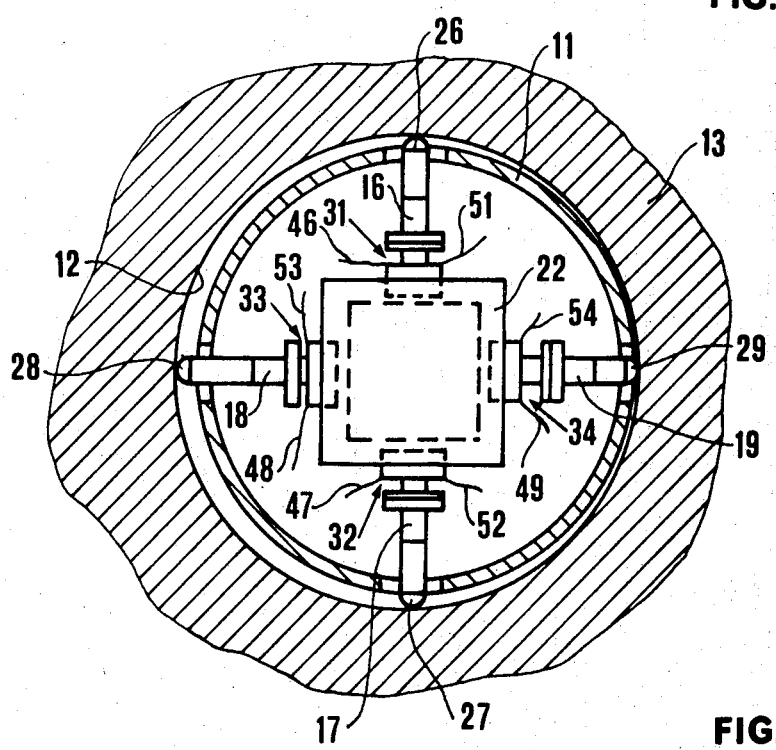
FIG. 1 is a plan view, partially in section of a measurement member in accordance with the invention.

In particular, the present description relates to a device for correcting errors due to the inaccurate positioning of a cylindrical measuring pad 11 (FIG. 1 and 2) within a hole 12 which is to be measured, contained in a general piece 13, as a result of the play present between the pad 11 and the hole 12. The measurer, for each of the dimensions in question, operates as a zero comparator.

The pad 11 constitutes the protection for two pairs of feelers 16, 17 and 18, 19 which are perpendicular to each other. The feelers 16, 17 and 18, 19 are opposite each other and are formed of levers pivoted on pins 21 fastened on a central stem 22 of the pad 11. The feelers 16, 17, 18 and 19 are held against the hole 12 to be measured by the action of four springs 23. The contact part of the feelers 16, 17, 18 and 19 is formed of spherical caps 26, 27, 28 and 29 of hard metal whose centers are arranged in a plane perpendicular to the axis of the pad 11. Moreover, the feelers 16 and 17 are aligned as are the feelers 18 and 19 and these two pairs of feelers are perpendicular to each other.

The feelers 16, 17, 18 and 19 control position transducers 31, 32, 33 and 34 respectively, for instance of inductive type, which have their windings fastened on the central stem 22 and the corresponding armatures fastened to the feelers 16, 17, 18 and 19 respectively.

Each winding of the transducers 31, 32, 33, and 34 is formed of a part fed from the outside via the cables 46, 47, 48 and 49 and of an induced part terminating with two cables 51, 52, 53 and 54 from which a signal which depends on the position of the corresponding feeler is taken.

Referring to the illustrative diagram of FIG. 3, in which, for greater clarity, the play between pad and hole has been exaggerated, O is center of the hole 12 and P the center of the pad 11 which may be at any point within a circle having as radius the value of the play present between the pad 11 and the hole 12. Indicating by R the radius of the hole 12, by r the radius of the spherical caps 26, 27, 28 and 29 and by A, B, C and D the centers of the caps 26, 27, 28 and 29 respectively, the centers A, B, C and D upon displacement of the center P of the pad 11 with respect to the center O of the hole 12 move along a circumference of radius (R-r).

Indicating by A, B, C and D the positions of the centers of the spherical caps 26, 27, 28 and 29 when the center P of the pad coincides with the center O, that is to say, when it is in the optimum position for the measurement, by $A_1$, $B_1$, $C_1$ and $D_1$ the positions of said centers when the center P of the pad 11 is in the position indicated in FIG. 3 and by $A_o$, $B_o$, $C_o$ and $D_o$ the positions in which said centers have been nominally set to zero, or zeroized, then the error due to the erroneous positioning is given by $$[(\overline{AB}+2r) - (\overline{A_oB_o}+2r)] - [(\overline{A_1B_1}+2r) - (\overline{A_oB_o}+2r)] = e$$

In this relationship, the term $[(\overline{A_1B_1}+2r) - (\overline{A_oB_o}+2r)]$ is the quantity found by totalizing the measurements obtained by the two feelers 16 and 17, neglecting the difference between the quantity $r$ and the distance of the points $A_1$ and $B_1$ from the surface of the hole 12 measured along the respective feelers 16 and 17, and the term $[(\overline{AB}+2r) - (\overline{A_oB_o}+2r)]$ represents the exact size of the diameter to be measured.

By simplifying the above relationship there is obtained:

$$\overline{AB} - \overline{A_1B_1} = e$$

Considering $\overline{AB} = \overline{A_oB_o}$, namely considering the error relative to the nominal diameter, we have:

$$\overline{A_oB_o} - \overline{A_1B_1} = e$$

Indicating by $\alpha$ the angle $\widehat{AOA_1}$, which is equal to the angle $\widehat{BOB_1}$, we have:
$\overline{A_oB_o} = 2(R-r)$
$\overline{A_1B_1} = 2(R-r) \cos \alpha$ and therefore
$e = 2[(R-r) - (R-r) \cos \alpha] = 2(R\ r)(1-\cos\alpha)$ (1)

For smaller angles $\alpha$, one can, with good approximation, write:
$\cos \alpha = 1 - \alpha^2/2$ for which equation (1) becomes:
$$e = (R-r) \cdot \alpha^2 \qquad (2)$$

Indicating by $d$ the difference between the center O and the point $P_1$ which is the projection of the center P on the diameter marked by C and D, we have, for sufficiently small angles:

$$\alpha \cong \tan \alpha \cong d/(R-r) \qquad (3)$$

Indicating by $P_2$ the projection of the point P on the diameter marked by A and B and by $\overline{18}$ and $\overline{19}$ the value detected by the detectors 18 and 19, we furthermore have:

$$d = \overline{PP_2} = (\overline{19}-\overline{18})/2 \qquad (4)$$

Substituting equation (4) in equation (3) and then in equation (2), we obtain:

$$e = (\overline{19}-\overline{18})^2 / 4(R-r) \qquad (5)$$

Indicating by $D_V$ the diameter to be determined with the feelers 16 and 17 and by $\overline{16}$ and $\overline{17}$ the actual values found by the feelers 16 and 17, we finally have:

$$D_V = (\overline{16}+\overline{17}) + (\overline{19}-\overline{18})^2 / 4(R-r) \qquad (6)$$

Repeating an identical procedure for the diameter $D_H$ to be determined by the feelers 18 and 19, we have:

$$D_H = (\overline{18}+\overline{19}) + (\overline{17}-\overline{16})^2 / 4(R-r) \qquad (7)$$

Accordingly, the measurement of the diameters consists of a first main term or component comprising the measurements detected by the feelers arranged along the corresponding direction and by a corrective term or component which takes into account the eccentricity of the pad 11 with respect to the hole 12 and which is related to the square of the difference between the measurement detected by the feelers acting along a direction perpendicular to that to be measured.

Figure 4:
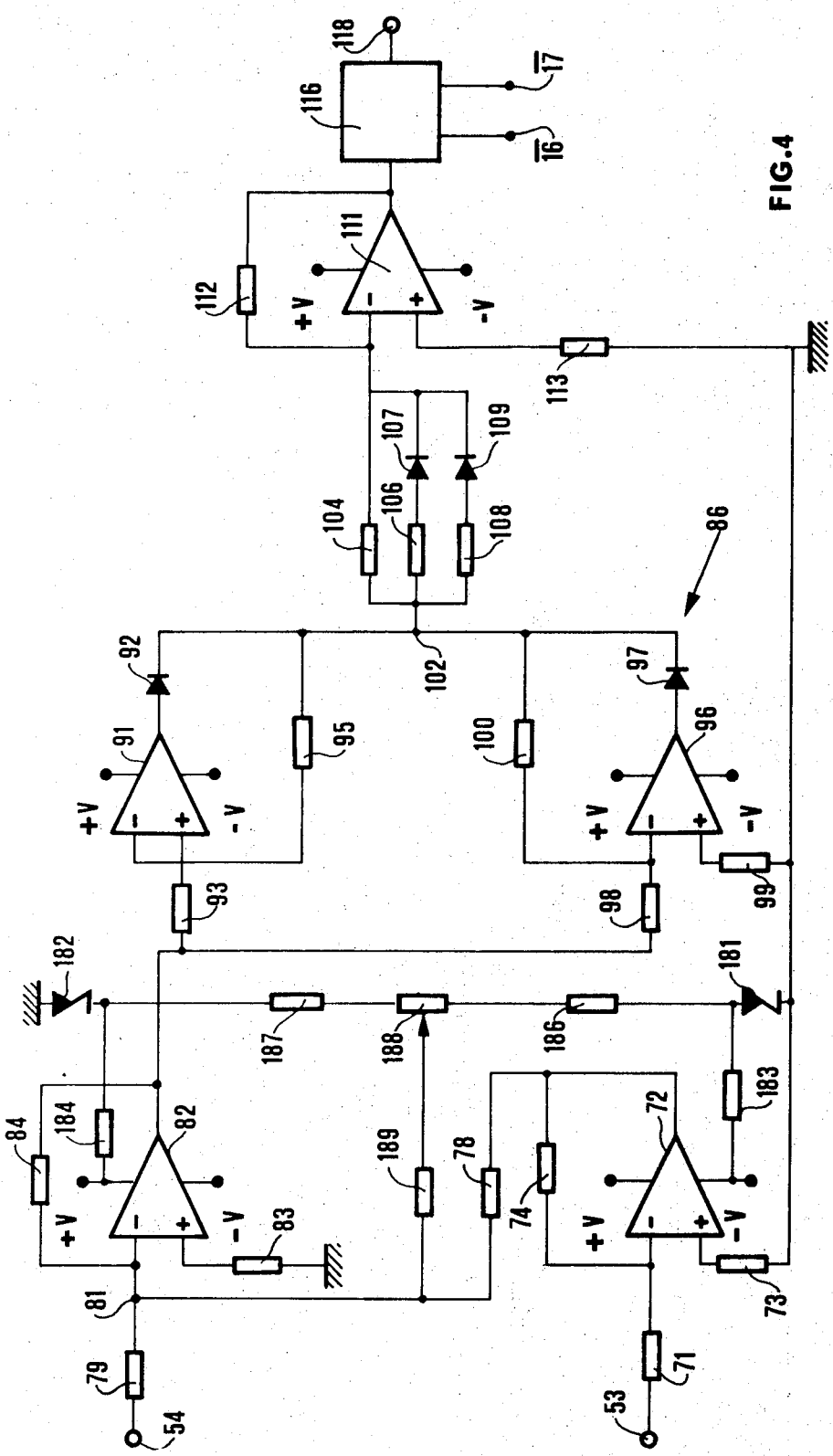
FIG. 4 is a diagram of the correction device in accordance with the invention.

The correct measurement of the diameter in this way may be determined by means of the circuit of FIG. 4.

The measurement $\overline{18}$ is fed, via a cable 53 and a resistor 71, to the input of an operational amplifier 72 which is connected in such a manner as to operate as an inverter, with the positive input polarized towards ground via a resistor 73. The operational amplifier 72 is fed by the voltages +V and −V and is fed back by a resistor 74 equal to the resistor 71 so as to guarantee that the gain is equal to one. At the output, we therefore have a magnitude $-\overline{18}$. This magnitude and the measurement $\overline{19}$, across two equal resistors 78, 79 respectively, converge in a node 81, in which we have the sum of the two magnitudes, namely the magnitude $(\overline{19}-\overline{18})$, which from same passes to an inverter 82 fed by the voltages +V and −V and having a positive input polarized towards ground by a resistor 83. The output of the inverter 82 is fed back via resistor 84 which stabilizes it on a gain of 0.5 (−0.5) so that at the output we have the quantity $(\overline{19}-\overline{18})/2$.

This quantity is introduced to the input of a circuit 86 capable of detecting the absolute value thereof. The circuit 86 comprises an operational amplifier 91 fed by the voltages +V and −V and having at the outlet a diode 92 polarized so as to permit passage only for positive voltages. The amplifier is polarized by two resistors 93 and 95 so as to have a gain of one.

The circuit 86 comprises a second operational amplifier 96 operating as inverter and fed by the voltages +V and −V and having on the output a diode 97 polarized in such a manner as to permit only the passage of the positive voltages. The inverter 96 is also polarized by three resistors 98, 99 and 100 so as to have a gain of unity.

If there is a positive voltage at the input of the two amplifiers 91 and 96 this value is found positive at the output of the amplifier 91 and thus, via the diode 92, at a node 102. The amplifier 96, operating as an inverter, has however at its output a negative value which is blocked by the diode 97.

If, however, at the input of the two amplifiers 91 and 96 there is a negative voltage, then there is still present at the output of the amplifier 91 a negative voltage which is blocked by the diode 92 while at the output of the amplifier 96 there is a positive voltage which passes through the diode 97 and is brought to the node 102. As a result, there is always present at the node 102 a positive voltage equal to the absolute value of the voltage which is present at the input of the circuit 86, namely equal to $(\overline{19}-\overline{18})/2$.

From the node 102, there extend in parallel three branches the first of which is formed of a resistor 104, the second of a resistor 106 and of a diode 107 and the third of a resistor 108 and a diode 109. These three branches extend to the input of an operational amplifier 111 connected so as to operate as inverter and having a feedback resistor 112. The operational amplifier 111 is fed by the voltages +V and −V and is polarized on the positive input by a resistor 113.

The diameter $D_V$, as expressed by equation (6), is given by an expression containing a square term which is a function of the magnitudes $(\overline{19}-\overline{18})^2$ which graphically can be represented by a parabola having its vertex on the origin of the axes. As shown in FIG. 5, this parabola may be approximated, for a certain distance, by a broken line formed in the case in question by three straight lines OM; MN; NZ.

Plotting on the abscissa the voltage Vi of the node 102 and on the ordinate the voltage ($Vu$) at the output of the amplifier 111 and selecting the diodes 107 and 109 in such a manner that their thresholds coincide with the value of the abscissas of the points M and N, we have the result that as long as the voltage remains below the lever of the threshold of the diodes 107 and 109 only the resistor 104 conducts and the gain of the amplifier 111 is determined by the ratio between the resistance 112 and the resistance 104, selected in such a manner as to produce the desired slope for the segment OM.

When the voltage exceeds the threshold level of the diode 107, but remains below the threshold level of the diode 109, the current at the input of the amplifier 111 passes through resistor 104 and resistor 106 in series with the diode 107 whereby the gain of the amplifier 111 is determined by the ratio between the resistance 112 and the resistance resulting from the parallel connection of resistor 104 and the resistor 106 added to the resistance of the diode 107. This gain is selected in such a manner as to produce the desired slope for the segment MN.

Finally, when the voltage also exceeds the threshold level of the diode 109, the current passes through the three branches to the input of the amplifier 111 whereby the gain of the said amplifier is determined by the ratio between the resistance 112 and the resistance resulting from the parallel connection of resistor 104, resistor 106 in series with diode 107 and resistor 108 in series with diode 109. This gain is selected in such a manner as to produce the desired slope for the segment NZ.

Summarizing, at the output of the amplifier 111 there is a voltage having a magnitude, in absolute value, which is approximately a quadratic function of the input function. This voltage represents substantially the term:

$$-(\overline{19}-\overline{18})^2 / 4(R-r)$$

This term enters together with the magnitudes $\overline{16}$ and $\overline{17}$ at the input of a substractor generally indicated as 116 at the output 118 of which there is the magnitude:

$$D_{1'} = (\overline{16}+\overline{17}) + (\overline{19}-\overline{18})^2 / 4(R-r)$$

The device now described makes it possible also to effect in very simple fashion the correction of errors resulting from erroneous positioning of the feelers within the protective pad. The circuit in question comprises two Zener diodes 181 and 182 which are polarized in opposite direction to each other and fed respectively via two resistors 183 and 194 which have the voltages −V and +V. The two Zener diodes 181 and 182 are connected via two identical resistors 186, 187 to a central potentiometer 188. The output current of the potentiometer 188 is summated, across a resistor 189, with that at the output of the operational amplifier 72.

When the wiper of potentiometer 188 is centered the current at the output is zero. By suitably shifting it, there can be added to the output of the operational amplifier 72 a positive or negative signal so as to introduce the necessary correction with due consideration of the displacement of the feelers from the zero position. Once this zeroizing has been effected, the wiper of potentiometer 188 can be locked in this zeroizing position, the correction to be made to the signal being constant.

It is clear that the device, in accordance with the invention with suitable variations, can be used to correct errors in positioning of parts different from that described above. For example, the device can be used for the correction of the errors resulting from the erroneous positioning of a shaft 161 with respect to the measurement feelers. In particular, if the shaft is positioned with the axis not perpendicular to that joining the two feelers, the two feelers will detect a magnitude different from the diameter.

Referring to FIG. 6, and if the instrument is a zero comparator, indicating by Do the nominal diameter of the shaft 161, by $D_a$ the actual diameter to be measured by $D_b$ the distance between the two points of contact of two feelers F and G and by $\overline{F}$ and $\overline{G}$ the measurements detected by the feelers F and G, we have:

$$(\overline{F}+\overline{G}) = D_b - Do = D_a/\cos \beta - Do$$

(11)

in which $\beta$ is the angle formed between the diametral plane and the plane containing the two feelers. For a sufficiently small value of $\beta$, we have:

$$\cos \beta = 1 - \beta^2/2$$

and also $$1/\cos \beta \cong 1/(1-\beta^2/2) \cong 1+\beta^2/2$$

Substituting this in equation (11) we have:

$$(\overline{F}+\overline{G}) = (D_a - Do) + D_a \cdot \beta^2/2$$

(12)

in which ($D_a - Do$) is the difference between the actual diameter and the nominal diameter while $D_a \cdot \beta^2/2$ is the error due to the rotation of the shaft to be measured with respect to the feelers. For a sufficiently small value of $\beta$, we can write:

$D_a \cdot \beta^2/2 \cong Do \cdot \beta^2/2$ and therefore:

$$(\overline{F}+\overline{G}) = (D_a - Do) + Do \cdot \beta^2/2$$

or else:

$$(D_a - Do) = (\overline{F}+\overline{G}) - Do \cdot \beta^2/2$$

Let us now assume that the second pair of feelers R, S are arranged at a distance L from the feelers F and G.

Indicating by U and V the points of intersection of the line connecting the feelers F and G and the line connecting the feelers R and S respectively with the axis of the shaft 161 and by $u$ and $v$ the distances of the points U and V from the theoretical axis we have:

$$u = (\overline{F} - \overline{G})/2 \quad (14)$$

$$v = (\overline{R} - \overline{S})/2 \quad (15)$$

$$\tan \beta = (u-v)/L = [(\overline{F}-\overline{G}) - (\overline{R}-\overline{S})]/2 \cdot L$$

Substituting this in equation (13) we have:

$$(D_a - Do) = (\overline{F} + \overline{G}) - Do/8 \cdot L^2 (\overline{F}\text{-}\overline{G}\text{-}\overline{R}+\overline{S})^2 \quad (16)$$

This equation can be solved with a circuit substantially identical to that shown in FIG. 4 in which the magnitude $(\overline{F}+\overline{S})$ is applied to the input 54, the magnitude $(\overline{G}+\overline{R})$ to the input 53 and the magnitudes $-\overline{F}$ and $-\overline{G}$ to the input of the substractor 116. The same reasoning can be repeated for the diameter measured by the feelers R and S.

What is claimed is:

1. Measuring apparatus for indicating a dimension of a work piece including means for providing a totalized output signal proportional to said dimension, comprising:
   a support means;
   first and second pairs of opposed feelers supported by said support means engaging surfaces of said work piece;
   first and second pairs of position transducers coupled to said first and second pairs of feelers respectively, each of said transducers producing an output signal proportional to the position of a corresponding feeler; and
   electrical means coupled to each of said transducers for providing an output signal indicative of the position of each of said transducers, said electrical means including
      a first circuit means for providing a compensation signal comprising a second order function of a combination of the output signals of said first and second pairs of transducers, and
      a second circuit means for summing said compensation signal and the output signals of one of said first and second pairs of transducers to produce said totalized output signal.

2. Measuring apparatus for indicating a dimension of a work piece including means for providing a totalized output signal proportional to said dimension, comprising:
   a support means;
   first and second pairs of opposed feelers supported by said support means engaging surfaces of said work piece;
   first and second pairs of position transducers coupled to said first and second pairs of feelers respectively, each of said transducers producing an output signal proportional to the position of a corresponding feeler; and
   electrical means coupled to each of said transducers for providing an output signal indicative of the position of each of said transducers, said electrical means including
      a first circuit means for providing a compensation signal comprising a second order function of a combination of the output signals of said second pair of transducers, and
      a second circuit means for summing said compensation signal and the output signals of said first pair of transducers to produce said totalized output signal.

3. The measuring apparatus as defined by claim 2, wherein said surfaces comprise side portions of a hole; and further comprising means for moving said first pair of feelers and said second pair of feelers along substantially perpendicular directions.

4. The measuring apparatus as defined by claim 2, wherein said compensation signal comprises a quadratic function of the difference of the output signals of said second pair of transducers and said circuit includes means for summing said quadratic function with a signal proportional to the sum of the output signals of the first pair of transducers.

5. The measuring apparatus as defined by claim 2, wherein said electrical circuit for providing a compensation signal comprises first electrical means for producing a voltage proportional to the absolute value of the difference between the output signals of said second pair of transducers and second electrical means coupled to the output of said first electrical means for producing a voltage approximating a quadratic function of said absolute value.

6. The measuring apparatus as defined by claim 5, wherein said first electrical means comprises a first feedback amplifier having its input coupled to one transducer of said second pair and a second feedback amplifier, acting as inverter, having its input coupled to the other transducer of said second pair and its output coupled to said first feedback amplfier, the output of said first feedback amplfier being coupled to the inputs of two operational amplifier circuits, adapted to provide an output signal equal to the absolute value of the input signal, this output signal being fed to an amplifier circuit having variable gain depending on the value of the input signal, said variable gain amplifier circuit providing a voltage approximating a quadratic function of said absolute value.

7. The measuring apparatus as defined in claim 5, wherein said second electrical means comprises a feedback operational amplifier and a plurality of diodes and resistances forming impedances connected in parallel between the input of said amplifier and the output of said first electrical means, said second electrical means producing a voltage approximating said quadratic function by a plurality of linear functions.

* * * * *

UNITED STATES PATENT OFFICE
CERTIFICATE OF CORRECTION

Patent No. 3,808,696          Dated  May 7, 1974

Inventor(s)    MARIO POSSATI

It is certified that error appears in the above-identified patent and that said Letters Patent are hereby corrected as shown below:

[73] Change "Finke" to --Finike--; change "Accomadita" to --Accomandita--.

[30] Change "3651/70" to --3651 A/70--.

Column 4, line 64, change "$(\overline{19}-\overline{18})/2$" to --$|\overline{19}-\overline{18}|/2$--.

Column 5, line 16, change "(Vu)" to --$|Vu|$--.

Column 5, line 67, change "194" to --184--.

Signed and sealed this 12th day of November 1974.

(SEAL)
Attest:

McCOY M. GIBSON JR.
Attesting Officer

C. MARSHALL DANN
Commissioner of Patents